United States Patent [19]

Dean, Jr.

[11] 4,432,434

[45] Feb. 21, 1984

[54] SOUND ABSORBING ARRANGEMENT FOR AIR HANDLING UNITS

[75] Inventor: Frank J. Dean, Jr., Jackson County, Mo.

[73] Assignee: Tempmaster Corporation, Kansas City, Mo.

[21] Appl. No.: 337,584

[22] Filed: Jan. 7, 1982

[51] Int. Cl.³ .............................................. F01N 1/24
[52] U.S. Cl. .................................. 181/225; 181/224; 181/296
[58] Field of Search .................. 181/224, 225, 296; 165/122, 135, 136

[56] References Cited

U.S. PATENT DOCUMENTS

| | | | |
|---|---|---|---|
| 1,964,845 | 7/1934 | Dietze et al. | 181/224 X |
| 3,554,112 | 1/1971 | Herb | 181/224 X |
| 3,949,830 | 4/1976 | Muehlbauer et al. | 181/224 |

Primary Examiner—Benjamin R. Fuller
Attorney, Agent, or Firm—Kokjer, Kircher, Bradley, Wharton, Bowman & Johnson

[57] ABSTRACT

An arrangement for attenuating noise in an air handling unit having a forwardly curved centrifugal fan and dampers downstream of the fan for varying the volume rate of air flow. The dampers are located downstream of the fan a distance L which is about 30 inches so that the critical acoustical frequency f=C/4L is relatively high (125 Hz). The discharge section of the air handling unit between the fan and the dampers is lined on the sides with acoustical panels that are effective in absorbing sound at the critical frequency.

7 Claims, 3 Drawing Figures

SOUND ABSORBING ARRANGEMENT FOR AIR HANDLING UNITS

BACKGROUND AND SUMMARY OF THE INVENTION

This invention relates generally to the field of heating and cooling equipment and more particularly to an arrangement for attenuating sound waves in an air handling unit.

Large volume heating and cooling systems typically include one or more air handling units, each of which has a large fan that draws air past heating/cooling coils and directs the conditioned air into distribution ducts extending throughout the building. In most systems, it is desirable for the air handling unit to have variable volume capability so that different volumes of conditioned air can be supplied under different conditions. Due to their simplicity and relatively low cost, discharge dampers in the outlet duct section of the air handling unit are preferable to other types of variable volume devices such as adjustable inlet vanes or speed control devices.

From the standpoint of energy efficiency, fans having forward curved blades are desirable in variable volume systems because their power requirements decrease rapidly with volume decreases caused by restriction of the air flow. However, due to acoustical problems associated with forward curved fans and instability under some operating conditions, forward curved fans have not been used extensively in variable volume air handling units.

The cause of oscillations leading to acoustical problems and instability can best be understood by referring to FIG. 3 of the accompanying drawings which is a graph of the pressure versus flow characteristic of a forward curved fan. The system normally operates at or near point A on the fan curve which is to the right of the fan curve maximum. However, when the discharge duct is restricted by partial closing of the dampers, the operating point can be shifted to the left of the fan curved peak to point B. Then, at frequencies where the acoustical resistance of the system (pressure divided by flow) seen by the fan is lower than the fan resistance described by the slope of the fan curve at point B, instabilities occur since the fan provides more pressure than is absorbed by the system as a whole.

When the dampers are closed or partially closed, the resulting oscillating variation in the operating point seen by the fan creates an acoustical wave which travels downstream from the fan. When the acoustical discontinuity represented by the partially closed dampers is encountered by the acoustical wave, it is reflected back toward the fan. The reflected wave arrives back at the fan after a time delay $T=2L/C$, where L is the distance between the fan and dampers and C is the speed of sound in air. If the round trip time delay T is such that the pressure of the reflected acoustical wave is opposite to the pressure of the transmitted wave, the pressures tend to cancel, and the combined pressure is lower than the pressure normally seen by the fan wheel. The fan wheel then senses a lower system resistance than is described by the system characteristic at point B on the fan curve. This effect occurs when the oscillation frequency f is approximately equal to $C/4L$ which represents a condition where the dampers are one quarter wave length downstream from the fan blades.

In cases where the amplitude of the reflected wave is nearly equal to that of the transmitted wave, there is nearly complete pressure cancellation and the acoustical resistance seen by the fan at the frequency $f=C/4L$ is nearly zero. Under these conditions, the slope of the acoustical resistance line is more horizontal than the slope of the fan curve at point B, and the fan provides more pressure than the system absorbs. The amplitude of the oscillation then increases to a potentially large value, and an undesirable surge effect occurs. Such an unstable condition is represented by the broken line in FIG. 3 labeled "Unstable Acoustical Resistance". There is no instability present when the slope of the acoustical resistance line is steeper than that of the fan curve, as indicated by the broken line labeled "Stable Acoustical Resistance" in FIG. 3.

Undesirable oscillation can be lessened by attenuating the sound waves so that the amplitude of the reflected wave is reduced substantially by the time it reaches the fan wheel. Then, there is little pressure cancellation and the acoustical resistance seen by the fan is only reduced by a small amount. The refected waves are normally reduced in their amplitudes by interposing sound absorbing material in the duct between the discharge of the fan and the dampers.

It would seem logical that maximum attenuation could be achieved by providing a long distance between the fan and damper in order to provide maximum attenuation length. However, this is not the case in actual practice because the frequency at which oscillation occurs ($f=C/4L$) decreases with increasing distance between the fans and dampers, and lower frequencies are more difficult to attenuate. In typical sound absorbing media, the attenuation in the frequency range of interest decreases at a greater than linear rate with decreasing frequency. Since the critical frequency ($f=C/4L$) varies linearly with the distance between the fan and dampers, the attenution per unit length decreases rapidly within increasing distance between fan and dampers. As a consequence, we have found that it is generally undesirable from an acoustical standpoint to locate the dampers a considerable distance downstream of the fan.

The primary goal of the present invention is to achieve stable acoustical characteristics in an air handling unit employing a forwardly curved fan. In accordance with the invention, the distance between the fan and dampers is short enough to result in a relatively high critical frequency which can be easily attenuated by conventional acoustical materials. Preferably, the average distance between the fan blades and dampers is about 30 inches, and the duct work in this area is lined with acoustical panels. The closed damper resonant frequency is then relatively high and is readily attenuated by the acoustical panels. The overall result is that acoustical instabilities and surge effects are avoided in a simple and effective manner without requiring long duct work or other extensive additions to or modifications of the basic air handling unit.

DETAILED DESCRIPTION OF THE INVENTION

In the accompanying drawings which form a part of the specification and are to be read in conjunction therewith and in which like reference numerals are used to indicate like parts in the various views.

Figure 1:
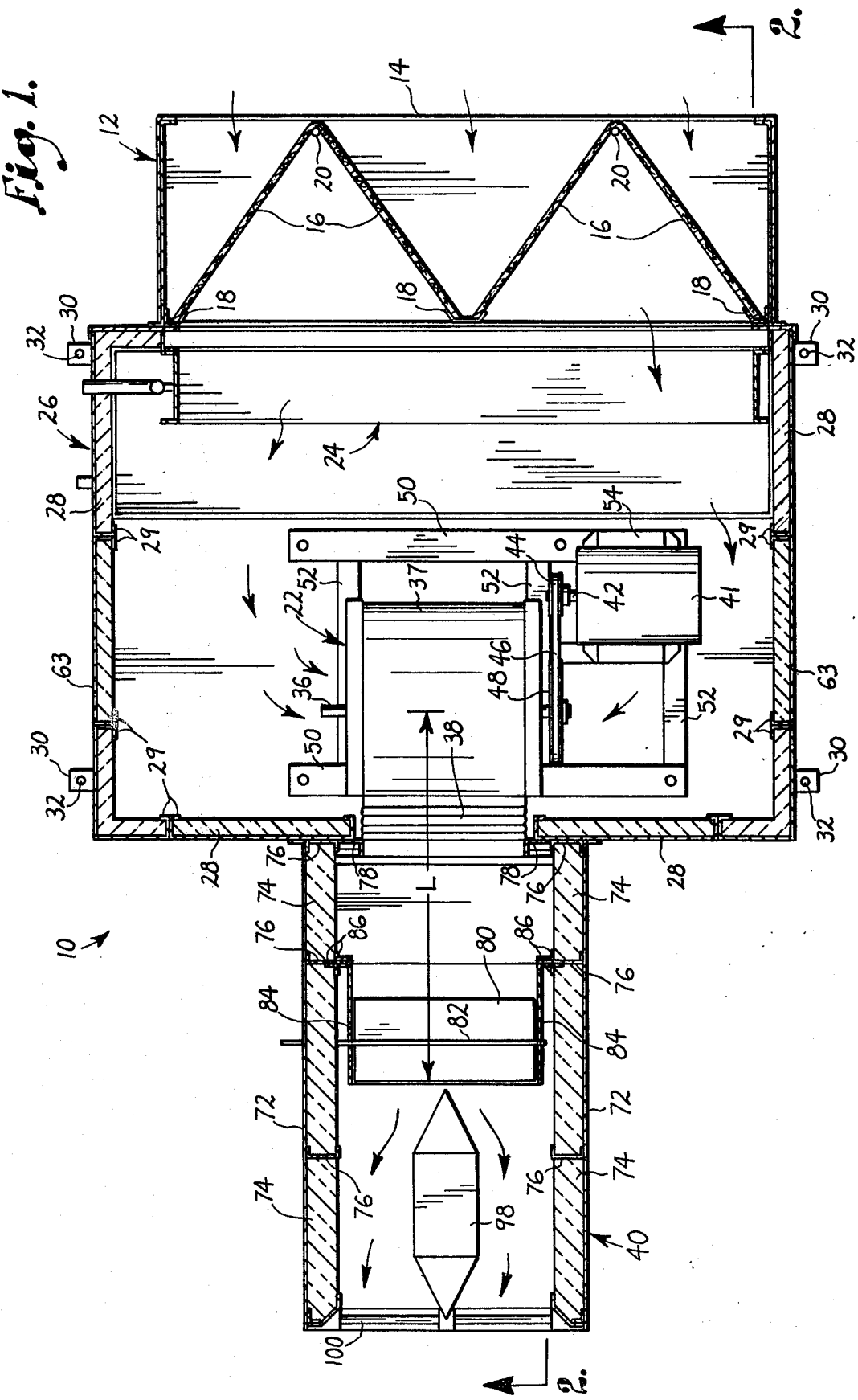
FIG. 1 is a sectional view taken on a horizontal plane of an air handling unit constructed according to a preferred embodiment of the present invention.

Referring now to the drawings in more detail, an air handling unit constructed in accordance with the present invention is generally designated by numeral 10. The air handling unit includes a filter section 12 which provides an inlet 14 into which air is drawn. The filter section 12 is generally rectangular and is constructed of sheet metal or a similar material which permits return air duct work (not shown) to be connected with the inlet 14. Within section 12, filters 16 are mounted in a V shaped arrangement in order to filter out dirt and the like. The filters 16 are supported by a framework which includes channels 18 and vertical rods 20 around which the filter media are drawn. The filters 16 may be either panels or flexible fabric constructed of resilient synthetic fibers bonded with a fire retardant resin.

The air handling unit includes a fan 22 and one or more banks of heating/cooling coils 24 located within a central box like housing 26 constructed of sheet metal or another suitable material. The inside surfaces of housing 28 are lined with insulating panels 28 held in place by channels 29 formed on the housing walls. The heating/cooling coils 24 are located adjacent to the connection between sections 12 and 26 and receive chilled water or a refrigerant in the cooling mode of operation and hot water or steam in the heating mode. The coils themselves form no part of the present invention and can be of any suitable type. A plurality of angles 30 are secured to the bottom of the central housing 26 in order to permit mounting of the unit to the floor, ceiling or other surface. Each angle 30 is provided with bolt holes 32 to facilitate mounting of the unit to a suitable surface.

Figure 2:
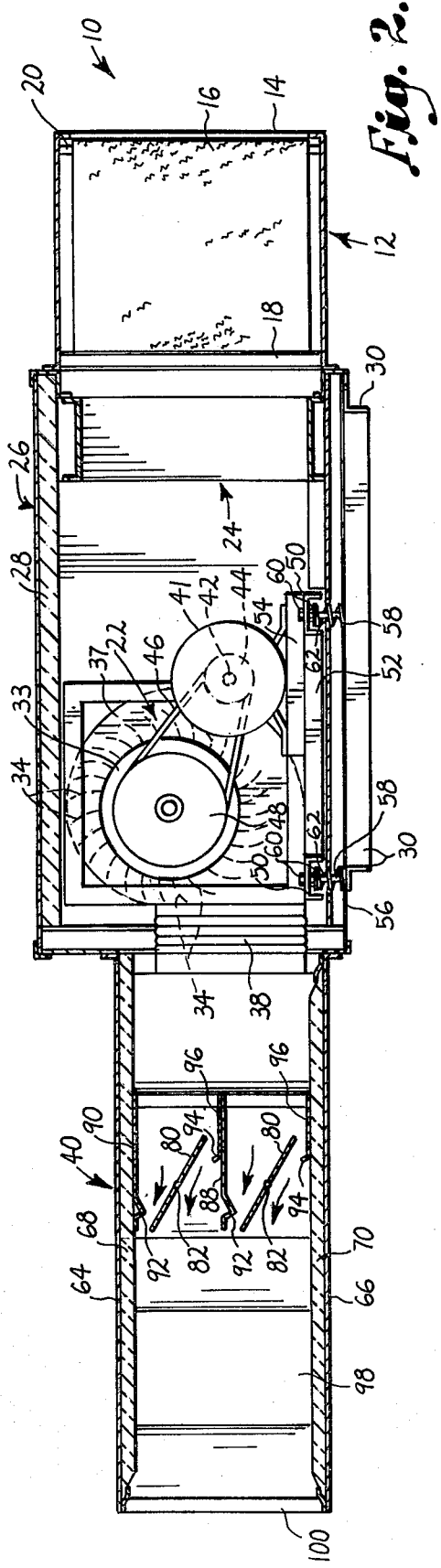
FIG. 2 is a sectional view taken generally along line 2—2 of FIG. 1 in the direction of the arrows.
Figure 3:
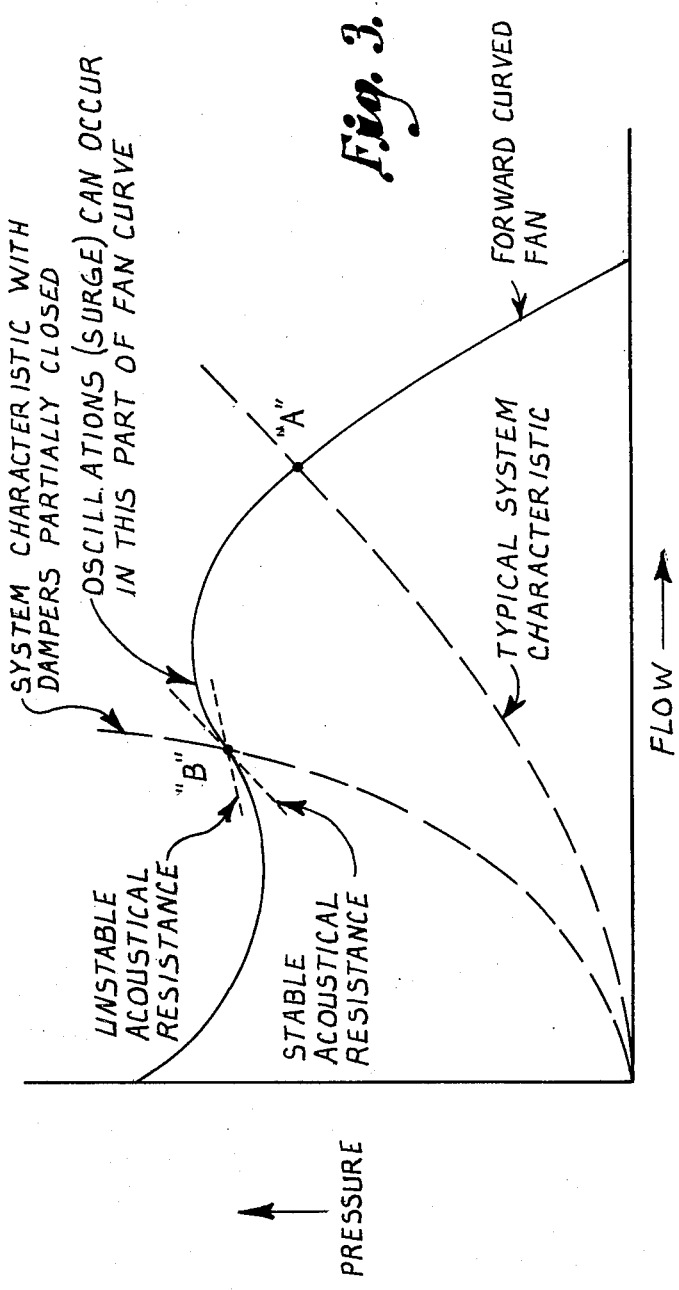
FIG. 3 is a graph of the pressure versus flow for the forward curved fan employed in the air handling unit, with the plots represented by the broken lines showing system characteristics at two different operating points.

The fan 22 is a forward curved centrifugal fan having a fan wheel or impeller 33 carrying a plurality of forwardly curved blades 34 (see FIG. 2). The fan wheel 33 is mounted on a horizontal shaft 36 forming the fan axis, and the blades 34 thus turn about shaft 36. The fan has a casing 37 which is open on its opposite sides in order to provide dual inlets to the fan. The fan housing has a flexible discharge 38 which is connected with a discharge section 40 of the air handling unit in order to direct the air flow into the discharge section.

The fan shaft 36 is driven by an electric motor 41 having a drive shaft 42 carrying a pulley 44. A belt 46 is drawn around pulley 44 and a larger pulley 48 mounted on shaft 46. The fan and motor assembly is mounted on a frame work formed by a pair of channels 50 and cross members 52. The motor 40 is mounted on a base 54 which is secured to the channels and cross members.

As best shown in FIG. 2, a plurality of studs 58 extend downwardly from each channel 50 and are secured by a pair of nuts 60. Springs 62 are coiled around studs 58 and serve to isolate the motor and fan assembly from the floor 56 and housing of the unit. Consequently, vibrations are not transmitted to the housing. Housing section 26 has access doors 63 on opposite sides providing access to the fan and motor assembly.

The flexible discharge 38 of the fan housing connects with the discharge section 40 which is in the form of a duct constructed of sheet metal. Section 40 is a rectangular duct having top and bottom panels 64 and 66 which are lined on their inside surfaces with acoustical panels 68 and 70 approximately 1½ inches thick. Section 40 has opposite side panels 72 which are lined with acoustical panels 74 approximately three inches thick. Channel members 76 are secured to the side panels 72 to hold panels 74 in place and to strengthen and stiffen the discharge section 40 of the air handling unit. The channels 76 that are adjacent to the central housing section 26 are provided with extensions 78 that connect with the flexible discharge 38 of the fan.

The discharge section 40 is provided with a pair of dampers 80 each mounted on a horizontal shaft 82. The shafts 82 are vertically spaced as shown in FIG. 2, and each shaft is supported for rotation on a pair of spaced apart panels 84 connected by angles 86 to one of the stiffening channels 76. One end of each shaft 72 extends through one of the side panels 72 and is preferably connected with a motor or other actuator (not shown) which acts to rotate the shaft in order to move the damper between the open and closed positions thereof. Preferably, the two shafts 82 are coupled in a manner to rotate them equally and simultaneously. It should be understood that two dampers are not required and a different number of dampers can be employed.

With reference to FIG. 2, a short horizontal partition 88 is mounted within discharge section 40 at a location midway between the upper and lower shafts 82. A similar panel member 90 is mounted to the underside of the upper acoustical panel 68. Members 88 and 90 are provided with downturned lips 92 against which the upper edge portions of dampers 80 seal when fully closed. The bottom edge portions of dampers 80 seal against upturned lips 94 formed on panels 96 mounted to partition 88 and the lower acoustical panel 70.

The acoustical panels 68, 70 and 74 are preferably formed from small fiber centrifugal fiberglass faced with fiberglass mat and layered on the inside with perforated metal. Additional acoustical treatment is provided by a sound attenuating module 98 located downstream of the dampers 80 and adjacent the outlet 100 of the air handling unit. The outlet 100 is suitable for connection with duct work (not shown) used to distribute the conditioned air throughout the building. The sound attenuating module 98 may be of the same type shown in U.S. Pat. No. 4,068,736 which issued on Jan. 17, 1978 to Dean et al.

In operation of the air handling unit, fan 22 draws air through the return duct work (not shown) connected with inlet 14. Dirt and other impurities in the air are removed by the filters 16, and the air is directed by the fan through the flexible discharge 38 and into the discharge section 40 which delivers it to the distribution duct work (not shown). The volume rate of flow of air can be varied by adjusting the positions of the dampers 80. When the dampers are partially closed as shown in FIG. 2, the air flow is restricted in comparison to the flow when the dampers are moved to the horizontal or fully open positions. The vibration isolation provided by springs 62 and the flexible construction of the fan discharge 38 prevents vibrations of the fan and motor assembly from being transmitted to the housing of the unit.

In accordance with the present invention, low frequency fan instability is avoided by locating the dampers relatively close to fan 22 such that the critical frequency $f=C/4L$ is relatively high. Preferably, the distance L between the damper shafts 82 and the fan axis 36 (which represents the average distance between the dampers and fan blades) is no more than about 30 inches. This results in a closed damper resonant frequency of approximately 125 Hz which is relatively high frequency that is easily attenuated.

The three inch thick acoustical panels 74 on the opposite sides of the outlet section 40 between the fan and the dampers are selected such that they are particularly effective in attenuating frequencies of about 125 Hz. For example, with fiberglass acoustical panels, the 30 inch duct section between the fan shaft 36 and the damper shafts 82 provides approximately 2 dB attenuation of an acoustical wave making a round trip from the fan to the partially closed dampers and back to the fan. Assuming a discharge pressure of 2.5 inches of water (guage) and the discharge velocity of 2500 feet per minute, if the dampers 82 are nearly closed such that there is 80% pressure reflection at the dampers, the amplitude of the reflected wave is approximately 60% of the transmitted wave amplitude. Thus, at the critical frequency, the net acoustical pressure seen by the fan blades is 40% of the pressure that would exist in the absence of dampers. The net acoustical flow is 160% of the value in the absence of dampers, and the net acoustical resistance seen by the fan blades, and the net acoustical resistance seen by the fan blades is approximately 25% of the value that would result in the absence of a damper. The slope of the acoustical resistance line passing through point B, and the situation is stable from the standpoint of acoustical reistance.

In the absence of effective acoustical panels 74 on the side of discharge section 40, the acoustical resistance seen by the fan blades would be about 11% of the value in the absense of a damper. Usually, this situation results in acoustical resistance which is more horizontal than the slope of the fan curve, and oscillations are thus possible. So long as the distance between the fan blades and dampers is relatively short (no more than about 30 inches) and the acoustical panels 74 are effective in attenuating sound at the critical frequency $f = C/4L$, the acoustical resistance line is steeper than the slope of the fan curve at points to the left of the fan curve maximum, and the acoustical resistance is stable such that effective noise attenuation is provided.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. In a variable volume air handling unit having a housing, a fan in the housing presenting a plurality of forwardly curved blades turning about a fan axis to draw air into an inlet side of the fan and discharge the air from a discharge side of the fan, and a duct connected with the discharge side of the fan, the improvement comprising:
   a damper mounted for opening and closing movement in said duct at a location downstream from the fan axis a distance having the dimension L; and
   acoustical material in said duct between the fan and damper, said acoustical material having effective sound absorbing ability at a sound wave frequency $f = C/4L$ where C represents the speed of sound.

2. The improvement set forth in claim 1, wherein the dimension L is no more than about 30 inches.

3. The improvement set forth in claim 1, wherein said duct has opposite sides, said acoustical material lining said opposite sides of the duct.

4. The improvement set forth in claim 1, wherein said duct has inside surfaces and said acoustical material forms a lining on said inside surfaces between the fan and damper.

5. A method of attenuating sound in a variable volume air handling unit having a forwardly curved fan acting to discharge air into a duct equipped with a flow controlling damper, said method comprising the steps of:
   locating the damper in said duct downstream from the fan a distance having the dimension L; and
   providing the duct with acoustical material between the fan and damper, said acoustical material having effective sound absorbing ability at a sound wave frequency $f = C/4L$ where C represents the speed of sound.

6. The method of claim 5, wherein the dimension L is no more than about 30 inches.

7. The method of claim 5, wherein the step providing the duct with acoustical material comprises lining inside surfaces of the duct with acoustical material.

* * * * *

UNITED STATES PATENT AND TRADEMARK OFFICE
CERTIFICATE OF CORRECTION

PATENT NO. : 4,432,434
DATED : Feb. 21, 1984
INVENTOR(S) : Frank J. Dean and Raymond H. Dean It is certified that error appears in the above-identified patent and that said Letters Patent are hereby corrected as shown below:

On the title page, Item [75]:

Please add the name of Raymond H. Dean, Shawnee Mission, Kansas as co-inventor.

Signed and Sealed this

Twenty-fourth Day of July 1984

[SEAL]

Attest:

GERALD J. MOSSINGHOFF

Attesting Officer     Commissioner of Patents and Trademarks